US010348226B2

(12) United States Patent
Park et al.

(10) Patent No.: US 10,348,226 B2
(45) Date of Patent: Jul. 9, 2019

(54) DEVICE AND CONTROL METHOD FOR DRIVING SENSORLESS BLDC MOTOR

(71) Applicants: Samsung Electronics Co., Ltd., Gyeonggi-do (KR); Industry-University Cooperation Foundation Hanyang University (IUCF-HYU), Seoul (KR)

(72) Inventors: Young Jae Park, Gyeonggi-do (KR); In Gun Kim, Gyeonggi-do (KR); Hyun Seok Hong, Gyeonggi-do (KR); Min Jae Kim, Gyeonggi-do (KR); Sin-Ae Kim, Gyeonggi-do (KR); Hyo Won Sin, Gyeonggi-do (KR); Ju Lee, Seoul (KR)

(73) Assignees: Samsung Electronics Co., Ltd., Suwon-si (KR); Industry-University Cooperation Foundation Hanyang University (IUCF-HYU), Seoul (KR)

( * ) Notice: Subject to any disclaimer, the term of this patent is extended or adjusted under 35 U.S.C. 154(b) by 219 days.

(21) Appl. No.: 15/334,045

(22) Filed: Oct. 25, 2016

(65) Prior Publication Data

US 2017/0155347 A1    Jun. 1, 2017

(30) Foreign Application Priority Data

Nov. 30, 2015   (KR) .................. 10-2015-0168591

(51) Int. Cl.
*H02P 6/14*       (2016.01)
*H02P 6/182*      (2016.01)
(Continued)

(52) U.S. Cl.
CPC .............. *H02P 6/182* (2013.01); *H02P 6/157* (2016.02); *H02P 27/08* (2013.01); *H02P 6/187* (2013.01)

(58) Field of Classification Search
CPC ........... H02P 6/182; H02P 27/08; H02P 6/187
(Continued)

(56) References Cited

U.S. PATENT DOCUMENTS 4,270,076 A  *  5/1981  Nygaard .................. H02P 6/06
                                                    318/400.31
4,654,566 A  *  3/1987  Erdman .................. F23N 3/082
                                                    318/400.01
(Continued)

FOREIGN PATENT DOCUMENTS

| JP | H09182486 A | 7/1997 |
| KR | 1019990074896 A | 10/1999 |
| KR | 1020140137123 A | 12/2014 |

OTHER PUBLICATIONS

European Patent Office, "European Search Report," Application No. EP 16 19 2412, dated Jun. 2, 2017, 8 pages.

*Primary Examiner* — Eduardo Colon Santana
*Assistant Examiner* — Gabriel Agared

(57) ABSTRACT

A device and control method for driving a sensorless brushless DC (BLDC) motor, particularly related to a technology configured to increase the accuracy of detection of Zero Cross Point through a non-commutation period in a pulse width modulation (PWM) control. The device for driving a sensorless BLDC motor to switch a current applied to a stator winding based on a position of a rotor includes a three phase inverter configured to convert a DC input voltage into a three phase AC voltage and supply the three phase AC voltage to the BLDC motor; a terminal voltage detector configured to detect a three phase terminal voltage from an output terminal of the three phase inverter; and a controller configured to perform a PWM control of the terminal voltage based on a three phase back electromotive force (EMF) included in the detected terminal voltage. The PWM
(Continued)

control includes a non-commutation control in which the switching of the current does not occur.

19 Claims, 12 Drawing Sheets

(51) Int. Cl.
    *H02P 27/08*     (2006.01)
    *H02P 6/15*     (2016.01)
    *H02P 6/18*     (2016.01)

(58) Field of Classification Search
    USPC .................................................. 318/400.26
    See application file for complete search history.

(56) References Cited

U.S. PATENT DOCUMENTS

| | | | |
|---|---|---|---|
| 4,757,241 A * | 7/1988 | Young | H02P 6/14 |
| | | | 318/400.13 |
| 5,672,948 A | 9/1997 | Cohen et al. | |
| 2004/0263104 A1 * | 12/2004 | Iwanaga | H02P 6/182 |
| | | | 318/400.35 |
| 2006/0132075 A1 | 6/2006 | Lee et al. | |
| 2006/0170383 A1 | 8/2006 | Narumi et al. | |
| 2008/0106224 A1 | 5/2008 | Fu et al. | |
| 2010/0181953 A1 | 7/2010 | Cheng | |
| 2014/0035500 A1 | 2/2014 | Lin et al. | |

* cited by examiner

DEVICE AND CONTROL METHOD FOR DRIVING SENSORLESS BLDC MOTOR

CROSS-REFERENCE TO RELATED APPLICATION(S) AND CLAIM OF PRIORITY

The present application is related to and claims the benefit of Korean Patent Application No. 10-2015-0168591, filed on Nov. 30, 2015 in the Korean Intellectual Property Office, the disclosure of which is incorporated herein by reference.

TECHNICAL FIELD

Embodiments of the present disclosure relate to a device and a control method for driving a sensorless BLDC motor, particularly related to a technology configured to increase the accuracy of detection of Zero Cross Point through a non-commutation period in a PWM control.

BACKGROUND

Generally, Brushless DC Motor (BLDC Motor) has a simple structure and a high efficiency, and is widely used in industry. Typically, an armature formed by applying a current to the coil is used as a BLDC motor stator and is a permanent magnet formed by repeated N and S poles and is used as a rotor.

In order that the BLDC motor is rotated continuously, it is necessary to form a continuous rotating magnetic field of the BLDC motor, and since the stator flux is rotated in synchronization with the magnetic field of the permanent magnets of the rotor, the position information of the rotor may be required. In other words, in order to form a continuous rotating magnetic field, it is necessary that commutation of the current flowing to each phase of coils of the armature be performed at the appropriate time, and it is required that the position of the rotor be precisely recognized for proper commutation. Herein, commutation represents changing the current direction of the motor stator coil to allow the rotor to be rotated.

For smooth operation of the BLDC motor, it is necessary that the position of the rotor and the phase current commutation time be exactly matched, and for this, a device configured to detect the position of the rotor is required. Generally, for the detection of the position of the rotor, a position detection sensor such as a Hall sensor, a resolver element and an encoder may be used. However, since manufacturing costs have increased and a driving circuit has become complicated recently, a sensorless method which can drive a motor without a sensor for the detection of the position of the rotor is used.

The method for driving a sensorless BLDC motor includes extracting a back electromotive force (EMF) generated in stator coil of each phase while the motor is rotated, and estimating position information of the rotor and each phase current commutation time by using a zero cross point of the phase back EMF.

SUMMARY

To address the above-discussed deficiencies, it is a primary object to provide a device and a control method for driving a sensorless BLDC motor that can increase the accuracy of detection of Zero Cross Point through a non-commutation period in the PWM control to precisely estimate position information of a rotor.

Additional aspects of the present disclosure will be set forth in part in the description that follows and, in part, will be obvious from the description, or may be learned by practice of the disclosure.

In accordance with one aspect of the present disclosure, a device for driving a sensorless BLDC motor to switch a current applied to a stator winding based on a position of a rotor includes a three phase inverter configured to convert a DC input voltage into a three phase AC voltage and supply the three phase AC voltage to the BLDC motor; a terminal voltage detector configured to detect a three phase terminal voltage from an output terminal of the three phase inverter, and a controller configured to perform a pulse width modulation (PWM) control of the terminal voltage based on a three phase back electromotive force (EMF) included in the detected terminal voltage, wherein the PWM control includes a non-commutation control in which the switching of the current does not occur.

The device may further include a Zero Crossing Point (ZCP) detector configured to detect a ZCP of the three phase back EMF based on a PWM signal generated by the PWM control of the terminal voltage.

The ZCP detector may include a Zero Point (ZP) comparator configured to detect a ZCP of the three phase back EMF by comparing the detected three phase terminal voltage with an input voltage of the motor.

The ZP comparator may output a positive voltage in a period in which a difference between the three phase terminal voltage and the input voltage of the motor is positive, and may output a Zero voltage in a period in which a difference between the three phase terminal voltage and the input voltage of the motor is negative.

The controller may perform a non-commutation control configured to generate a non-commutation signal period by removing a PWM signal for an operation of a switch switching the current.

The controller may detect a position of the rotor of the motor based on the detected ZCP of the three phase back EMF, and may control a switching operation of the three phase inverter based on the detected position of the rotor.

The ZCP detector may detect a ZCP of the three phase back EMF based on a non-commutation signal period generated by the PWM control of the terminal voltage including the non-commutation control.

The device may further include a phase current converter configured to drive the three phase inverter by determining a position of the rotor included in the motor based on the detected ZCP of the three phase back EMF, and determining a commutation time of the motor based on the determined position of the rotor.

The device may further include a PWM signal generator configured to determine a switching pattern of a PWM signal based on the PWM control, and transmit the switching pattern to the three phase inverter.

The device may further include a pulse width modulator configured to change a rotation speed of the motor by changing a pulse width of the PWM signal.

In accordance with another aspect of the present disclosure, a method for driving a sensorless BLDC motor to switch a current applied to a stator winding based on a position of a rotor includes converting a DC input voltage into a three phase AC voltage and supplying the three phase AC voltage to the BLDC motor; detecting a three phase terminal voltage from an output terminal of a three phase inverter; performing a PWM control of the terminal voltage including a non-commutation control in which the switching of the current does not occur based on a three phase back EMF included in the detected terminal voltage; and detecting a ZCP of the three phase back EMF based on a PWM signal generated by the PWM control of the terminal voltage.

The detection of the ZCP may detect a ZCP of the three phase back EMF by comparing the detected three phase terminal voltage with the input voltage of the motor.

The detection of the ZCP may output a positive voltage in a period in which a difference between the three phase terminal voltage and the input voltage of the motor is positive, and output a Zero voltage in a period in which a difference between the three phase terminal voltage and the input voltage of the motor is negative.

The non-commutation control may generate a non-commutation signal period by removing a PWM signal for an operation of a switch switching the current.

The method may further include detecting a position of the rotor of the motor based on the detected ZCP of the three phase back EMF and controlling a switching operation of the three phase inverter based on the detected position of the rotor.

The detection of the ZCP may detect a ZCP of the three phase back EMF based on a non-commutation signal period generated from the PWM control of the terminal voltage including the non-commutation control.

The method may further include driving the three phase inverter by determining a position of the rotor included in the motor based on the detected ZCP of the three phase back EMF, and determining a commutation time of the motor based on the determined position of the rotor.

The method may further include determining a switching pattern of a PWM signal based on the PWM control and transmitting the switching pattern to the three phase inverter.

The method may further include changing a rotation speed of the motor by changing a pulse width of the PWM signal.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
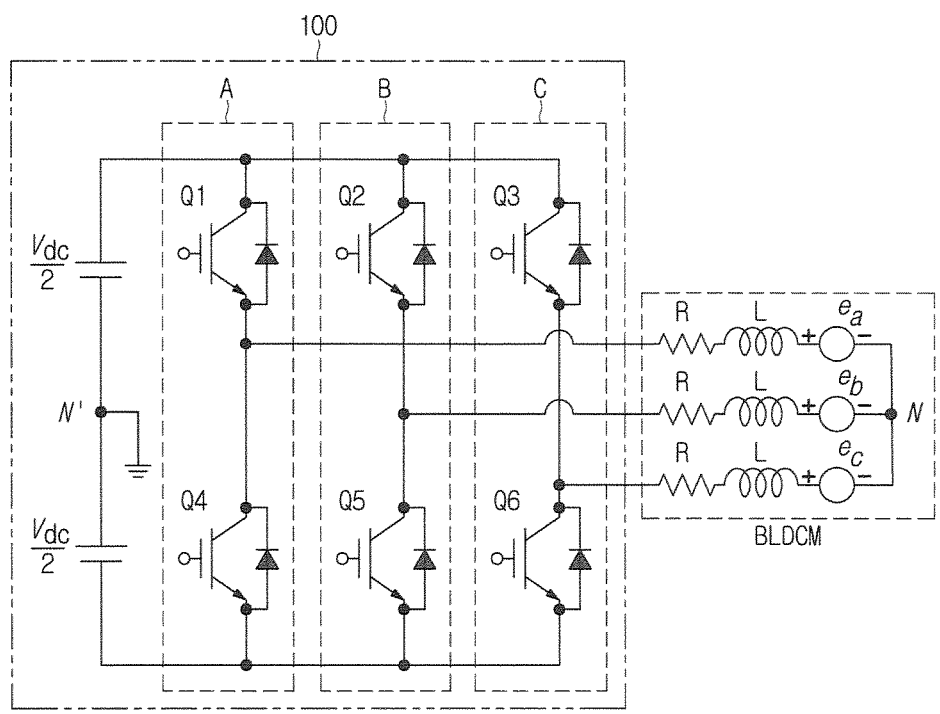
FIG. 1 is a view illustrating a connection between an inverter for driving a general BLDC motor and a motor.

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device or system. The present disclosure will be described more fully hereinafter with reference to the accompanying drawings, in which example embodiments of the present disclosure are shown.

As those skilled in the art would realize, the described embodiments may be modified in various different ways, all without departing from the spirit or scope of the present disclosure.

Reference will now be made in detail to embodiments of the present disclosure, examples of which are illustrated in the accompanying drawings. However, for the description of the present disclosure, if it is determined that detailed descriptions make embodiments of the present disclosure unclear, the detailed descriptions may be omitted. Parts which are not associated with the description are omitted in order to specifically describe the present disclosure, and like reference numerals refer to like elements throughout the specification. It will be understood that, although the terms first, second, third, etc., may be used herein to describe various elements, such elements are not limited by these terms. These terms are only used to distinguish one element from another element.

Throughout the present disclosure, "switching element" represents a wiring element configured to connect or disconnect the current in an electrical and electronic device. The switching element may include a transistor configured to connect the current according to a control signal, a bipolar junction transistor (BJT), and a field effect transistor (FET), but is not limited thereto.

When the switching element acts as a FET, the switching element may include a gate terminal, a drain terminal, and a source terminal. In addition, according to an input signal, the drain terminal may act as the source terminal, and the source terminal may act as the drain terminal.

The switching element may be divided into a low-voltage switching element (LN) operated in a low-voltage and a high-voltage switching element (HN) operated in a high-voltage. In some embodiments, the high-voltage switching element (HN) may be configured to withstand a state in which a high-voltage is applied to the drain terminal, and may be typically used in a variety of power elements.

The high-voltage switching element (HN) may include a Double-diffused MOSFET (DMOSFET), an Insulated Gate Bipolar Transistor (IGBT), an Extended Drain MOSFET (EDMOSFET), a Lateral Double-diffused MOSFET (LD-MOSFET), and a gallium nitride (GaN) transistor, but is not limited thereto.

Throughout the present disclosure, "turn-on" represents changing a state of switching element from non-conducting state to conducting state (commutation state). Particularly, "turn-on" represents supplying a signal to a gate to allow a current to flow to the switching element. In contrast, "turn-off" represents changing a state of switching element from conducting state to non-conducting state (non-commutation state).

As mentioned above, a method for driving a sensorless BLDC motor may include extracting a back electromotive force (EMF) generated in a stator coil of each phase while the motor is rotated, and estimating position information of the rotor and each phase current commutation time by using a Zero Crossing Point (ZCP) of the phase back EMF. The ZCP represents a cross point of a period in which a back EMF of each phase is passed at a zero point, and the control of driving motor may be allowed by detecting a position of the rotor without an additional position detection sensor, e.g., a hall sensor, through detecting the ZCP. However, the method may include measuring a phase voltage directly by using a neutral point that is not considered in manufacturing the motor. Accordingly, there may be limitation in extracting the phase back EMF and the ZCP, and the ZCP of the phase back EMF voltage may be extracted by comparing a terminal voltage with a half of a driving voltage of the motor. Therefore, the method for driving motor by using the aforementioned methods may be not applied in a low-speed driving area, in which a back EMF is small, and may have a difficulty in that a terminal voltage of a motor driven by a pulse width modulation method includes a noise component caused by a high-speed switching.

Figure 2:
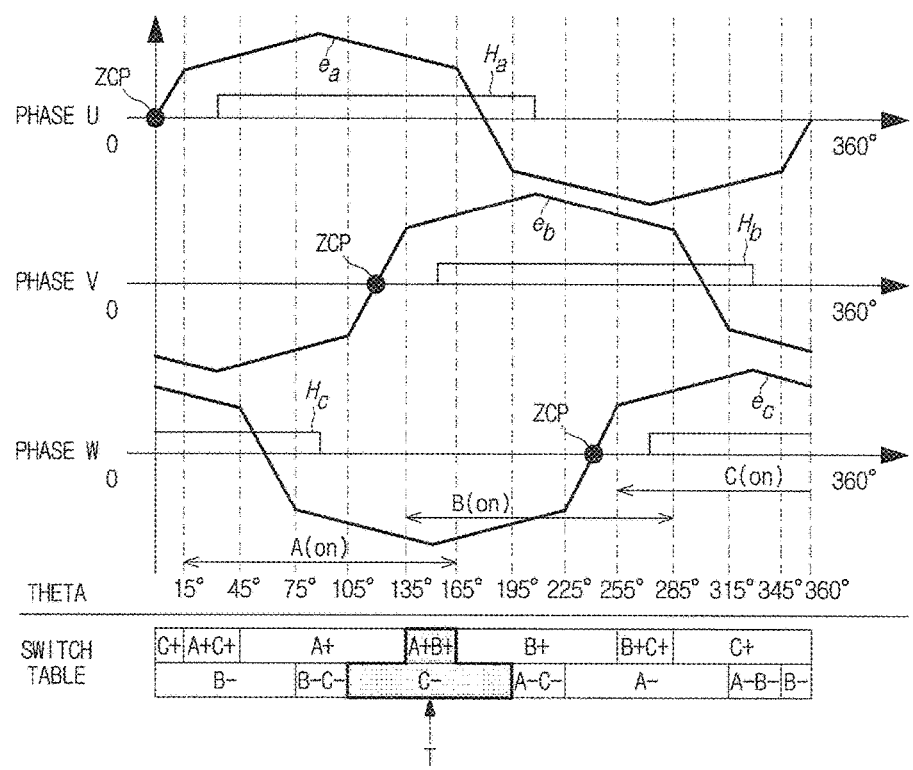
FIG. 2 is a view illustrating a three phase back electromotive force and a hall sensor for driving a BLDC motor.
Figure 3:
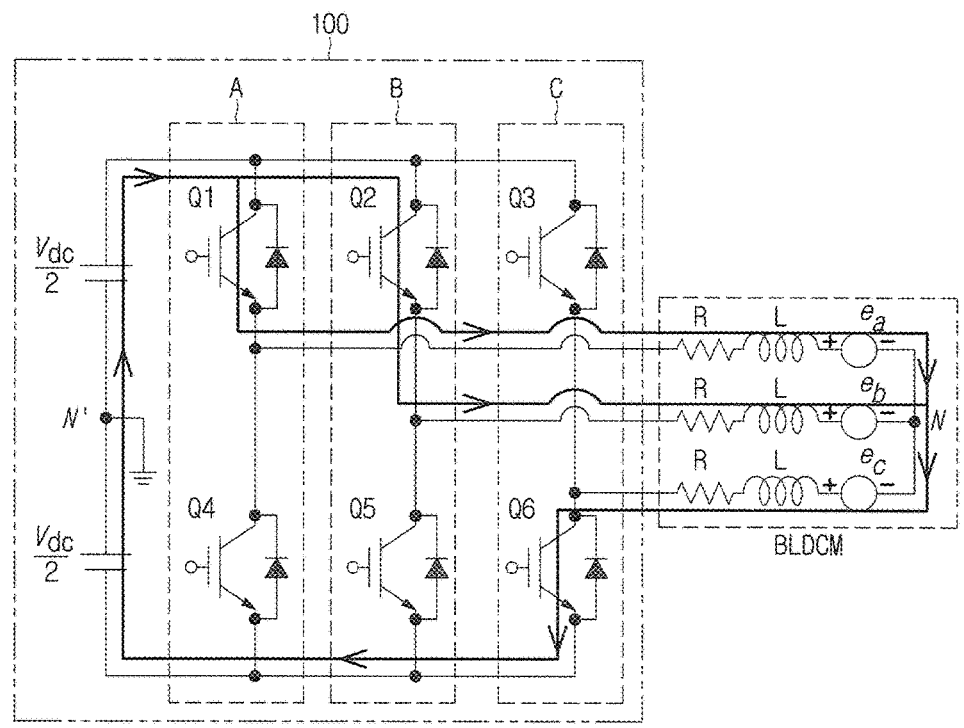
FIG. 3 is a view illustrating a current flow based on a switch control.

FIG. 1 is a view illustrating a connection between an inverter for driving a general BLDC motor and a motor, FIG. 2 is a view illustrating a three phase back electromotive force and a hall sensor for driving a BLDC motor, and FIG. 3 is a view illustrating a current flow based on a switch control.

A three phase inverter 100 to control a three BLDC motor may be illustrated in FIG. 1 and the three phase inverter 100 may be a driving circuit configured to perform 150 degree commutation control by using six Metal Oxide Silicon Field Effect Transistors (MOSFETs) to control voltage duty. In addition, as well as 150 degree commutation control, the control may be performed by a 120 degree commutation method, and the 150 degree commutation method may prevent an arm short caused by crossing operation of the switch in a mechanical manner (30 degrees) and may not need a dead time to prevent the arm short.

As illustrated in FIG. 1, a gate signal of 6 switches Q1 to Q6 included in the three phase inverter 100 may be a square wave form. In addition, a controller 70 may drive a switch by using a gate signal that is pulse width modulated (PWM) or pulse frequency modulated (PFM) by controlling a PWM signal generator 80.

Pulse width modulation (PWM) is one method of transmitting an analog signal after modulating into a digital signal having strength in the noise, because an analog is damaged due to the noise. That is, since the PWM is a method of modulating a pulse width as much as modulating an analog signal into a digital value, when a signal width is large, a pulse width may become large, and when a signal width is small, a pulse width may become small. The pulse frequency modulation (PFM) is a modulation method of changing pulse repetition frequency according to the size of signal, and when a signal is large, the repetition frequency may become large, and when a signal is small, the repetition frequency may become small. As mentioned above, a control method of switch operation may correspond to a well-known method.

The switch Q to Q6 may be implemented by a gallium nitride (GaN) field-effect transistor (FET). Silicon MOSFET (Si-MOSFET) is conventionally used as a switching element. The GaN FET known as a next-generation power semiconductor element may have a relative low conduction resistance, due to features of a wide band gap semiconductor compared with the Si MOSFET, so that the generation of heat may be minimized. In addition, the GaN FET may have a small capacitance value and may perform a high-speed switching due to short switching turn-on and turn-off time. A loss generated during switching may be less than Si-MOSFET. Accordingly, by using a switch implemented by the GaN FET, the high-efficiency of power factor correction circuit may be realized. Further, due to the high-frequency switching of the GaN FET, the volume of passive element may be reduced and the high-density of circuit may be realized. In addition, by using the high reverse recovery characteristics of the GaN FET element, the performance of the power factor correction circuit may be maximized.

Referring to FIG. 1, a switch Q1 and Q4 may be illustrated by 'A', a switch Q2 and Q5 may be illustrated by 'B' and a switch Q3 and Q6 may be illustrated by 'C'. A, B, and C are randomly set to describe a switching based on the three phase back EMF or a hall sensor signal.

The switch Q1 and Q4 may be not turned on or off at the same time, and when either the switch Q1 or Q4 is turned on, the other may be turned off. The switch Q2 and Q5 may not be turned on or off at the same time, and the switch Q3 and Q6 may not be turned on or off at the same time.

As illustrated in FIG. 1, each phase voltage of BLDC motor may be estimated as following Equation 1, and each phase voltage may include a component of phase current, a back EMF and a neutral point.

$$\begin{bmatrix} V_a \\ V_b \\ V_c \end{bmatrix} = R \begin{bmatrix} i_a \\ i_b \\ i_c \end{bmatrix} + L\frac{d}{dt}\begin{bmatrix} i_a \\ i_b \\ i_c \end{bmatrix} + \begin{bmatrix} e_a \\ e_b \\ e_c \end{bmatrix} + \begin{bmatrix} V_n \\ V_n \\ V_n \end{bmatrix} \quad \text{Equation 1}$$

Va, Vb, and Vc are a phase voltage, ia, ib, and ic are a phase current, ea, eb, and ec are a phase back EMF, and Vn is a neutral point voltage.

FIG. 2 illustrates the three phase back EMF and a hall sensor signal by a 150° commutation method.

A method by using a hall sensor may be a conventional method for detection of the position of the rotor, and may be configured to control a switching for driving a motor based on a signal Ha, Hb, and Hc detected by the hall sensor. In addition, a method for driving a sensorless BLDC motor may include extracting back EMF ea, eb, and ec from the stator coil of each phase while the motor is rotated, and estimating the position information of the rotor and commutation time of each phase current based on the extraction.

Referring to FIG. 2, a three phase DC motor may be represented by a Phase U, a Phase V, and a Phase W. According to the 150 degree commutation method, in an electrical angle calculated by dividing a signal period with 30°, between 15° and 165°, Q1 is turned on in the switch A of FIG. 1, between 135° and 285°, Q2 is turned on in the switch B of FIG. 1, and greater than 255°, Q3 is turned on in the switch C of FIG. 1.

Referring to the switch table illustrated in FIG. 2, A+ may represent that Q1 is turned on, and A− may represent that Q4 is turned on. In addition, B+ may represent that Q2 is turned on, and B− may represent Q5 is turned on. In the same way, C+ may represent that Q3 is turned on, and C− may represent Q6 is turned on. The switch table may be made based on a signal detected by a hall sensor or a back EMF generated in the stator coil of each phase while the motor is rotated, and based on the switch table, the current flow applied from the three phase inverter 100 of FIG. 1 to the three phase DC motor is illustrated in FIG. 3.

Based on an embodiment (T) of the switch table of FIG. 2, when an electrical angle is between 135°~165°, the switch table may be illustrated by A+, B+, and C−. That is, in this period, Q1, Q2 and Q6 may be turned on and the current flow applied from the three phase inverter 100 of FIG. 1 to the three phase direct current motor is illustrated in FIG. 3 so that the driving of the three phase DC motor may be controlled.

Figure 4:
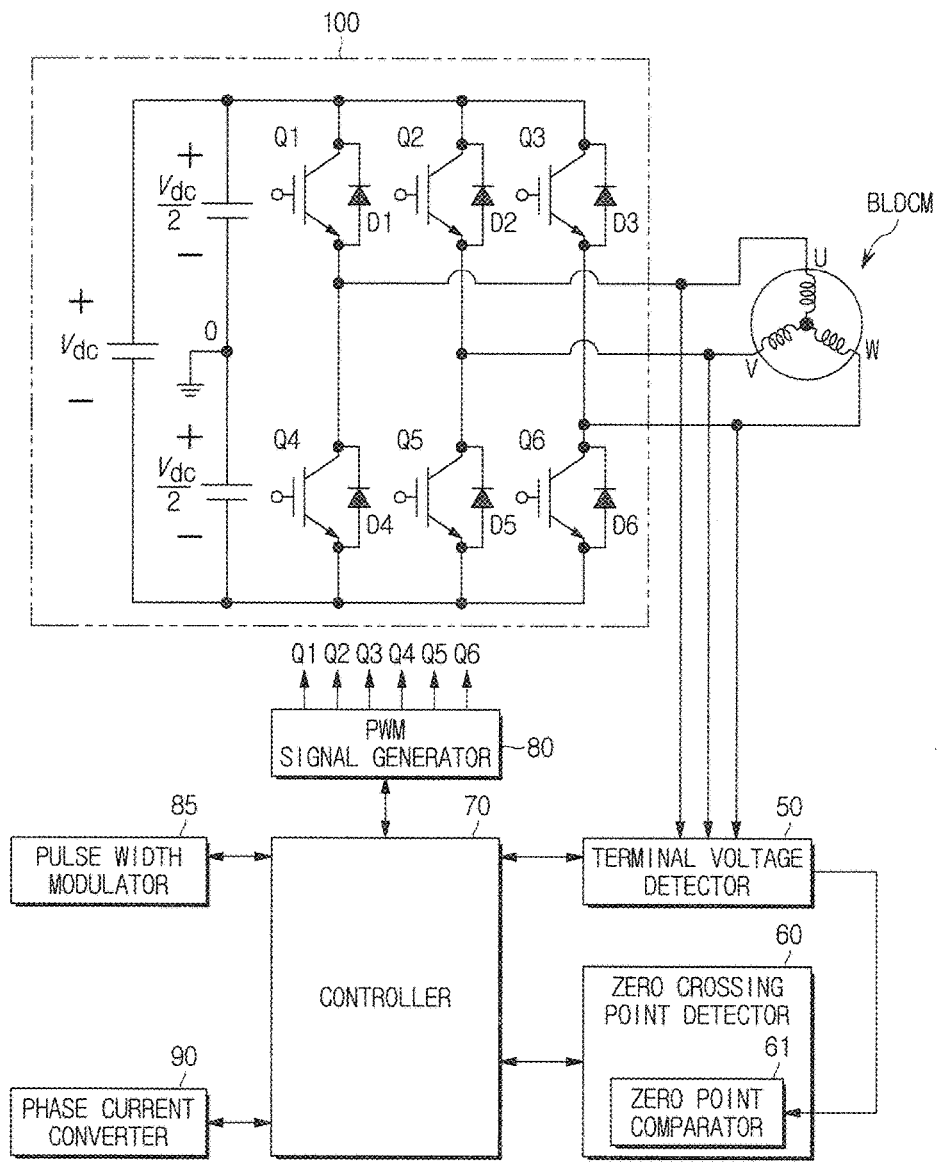
FIG. 4 is a control block diagram illustrating a device for driving a sensorless BLDC motor in accordance with an embodiment of the present disclosure.

FIG. 4 is a control block diagram illustrating a device for driving a sensorless BLDC motor in accordance with an embodiment of the present disclosure.

Referring to FIG. 4, a device for driving a sensorless BLDC motor in accordance with an embodiment may include a terminal voltage detector 50, a zero point detector 60, a PWM signal generator 80, a pulse width modulator 85, and a phase current converter 90.

The terminal voltage detector 50 may detect a three phase terminal voltage from an output terminal of the three phase inverter 100. That is, the three phase inverter 100 may convert DC input voltage supplied from the outside into a three phase AC voltage of pulse shape that is associated with driving the BLDC motor, and output the three phase AC voltage. The terminal voltage detector 50 may detect a voltage between terminals by calculating a voltage difference between the three phase output terminals of the three phase inverter 100, and input the voltage between terminals to the controller 70.

The voltage between terminals detected by the terminal voltage detector 50 may be calculated by a difference between each phase voltage of the BLDC motor, as illustrated in Equation 1. As mentioned above, each phase voltage may include a back EMF component, and the voltage between terminals detected by the terminal voltage detector 50 may include a back EMF of each phase of the three phase motor.

The ZCP detector 60 may extract a ZCP of three phase back EMF by comparing voltages between terminals detected by the terminal voltage detector 50 with a zero point of input voltage of the motor. That is, the terminal voltage detector 50 may detect a voltage between terminals including the three phase back EMF by receiving a voltage of each terminal from the BLDC motor, and transmit the detected voltage between terminals to a Zero Point (ZP) comparator 61 included in the ZCP detector 60.

The ZP comparator 61 may compare the three phase terminal voltage transmitted from the terminal voltage detector 50 with the input voltage of the motor, and then may output a positive voltage in a period in which a difference between the three phase terminal voltage and the input voltage of the motor is positive, and may output a Zero voltage in an period in which a difference between the three phase terminal voltage and the input voltage of the motor is negative.

The controller 70 may perform a PWM control of the terminal voltage based on the three phase back EMF included in the terminal voltage detected by the terminal voltage detector 50. The PWM control is a method of transmitting an analog signal after modulating into a digital signal having strength in the noise, because an analog is damaged due to the noise, when transmitting an analog signal in a wired or wireless method. That is, the controller 70 may modulate an analog signal of three phase back EMF included in the terminal voltage into a digital signal.

The PWM control performed by the controller 70 may include a non-commutation control, described later, and the non-commutation control may represent a control through generation of a non-commutation signal period in which a PWM signal is removed to prevent the switching of the current from occurring in the three phase inverter 100.

The ZCP detector 60 may detect a ZCP of the three phase back EMF based on a PWM signal generated from the PWM control including a non-commutation control of the three phase terminal voltage performed by the controller 70. The controller 70 may acquire the position information of the rotor based on the ZCP detected by the ZCP detector 60, and may transmit a control signal configured to control a PWM signal pattern supplied to the three phase inverter 100 to prevent over-current from being supplied to the motor by controlling a timing in which a voltage is applied to the stator winding. By transmitting a control signal, a switching operation of the three phase inverter 100 may be controlled. That is, the controller 70 may perform a control algorithm of the overall three phase inverter 100

The PWM signal generator 80 may determine a switching pattern of a PWM signal based on a PWM signal outputted by the controller 70 and transmit the determined switching pattern to the three phase inverter 100, so as to allow the switches Q1 to Q6 to be operated according to the switch pattern.

The pulse width modulator 85 may change a pulse width of a PWM signal outputted from the PWM signal generator 80 so as to change a rotation speed of the motor. The pulse width modulator 85 may adjust the switching of the three phase inverter 100 to vary the rotation speed of the motor so as to control a sensorless driving of the BLDC motor.

The phase current converter 90 may determine a position of the rotor of the three phase motor through a ZCP of the three phase back EMF extracted by the ZCP detector 60, and determine a commutation time based on the determination so as to control a the three phase inverter 100 to be operated.

Figure 5:
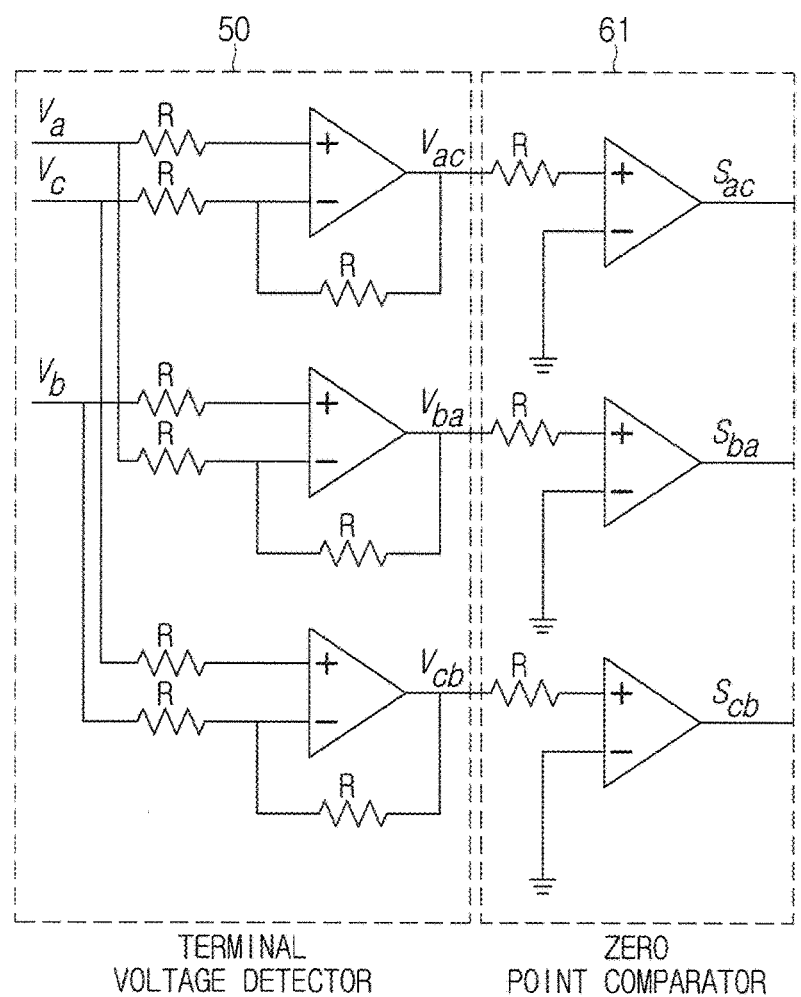
FIG. 5 is a control flow illustrating a terminal voltage detector and a zero point comparator in accordance with an embodiment of the present disclosure.
Figure 6:
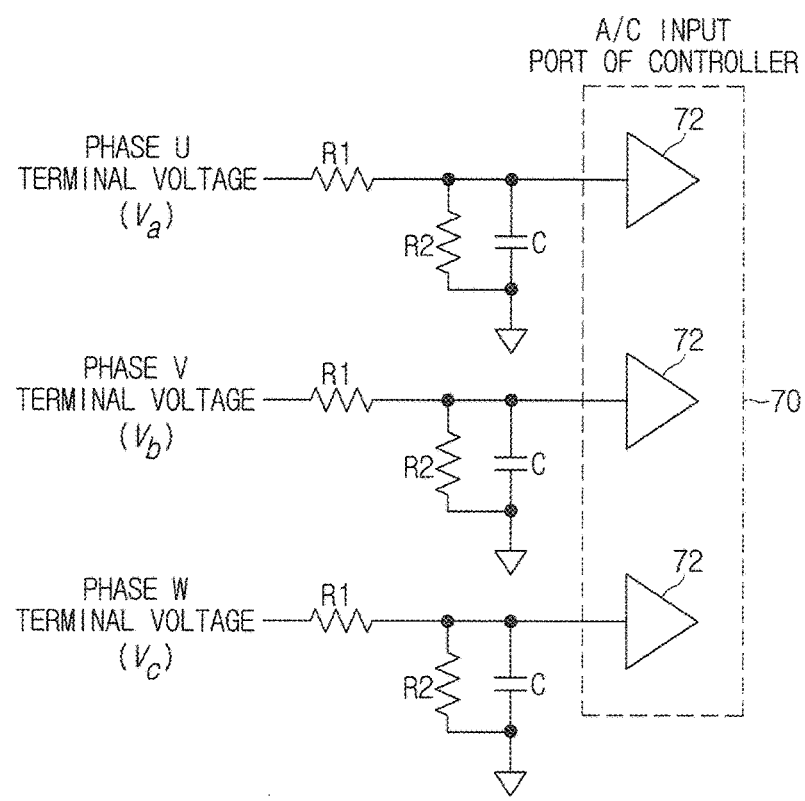
FIGS. 6 and 7 are views illustrating a detailed configuration of a terminal voltage detector in accordance with an embodiment of the present disclosure.
Figure 7:
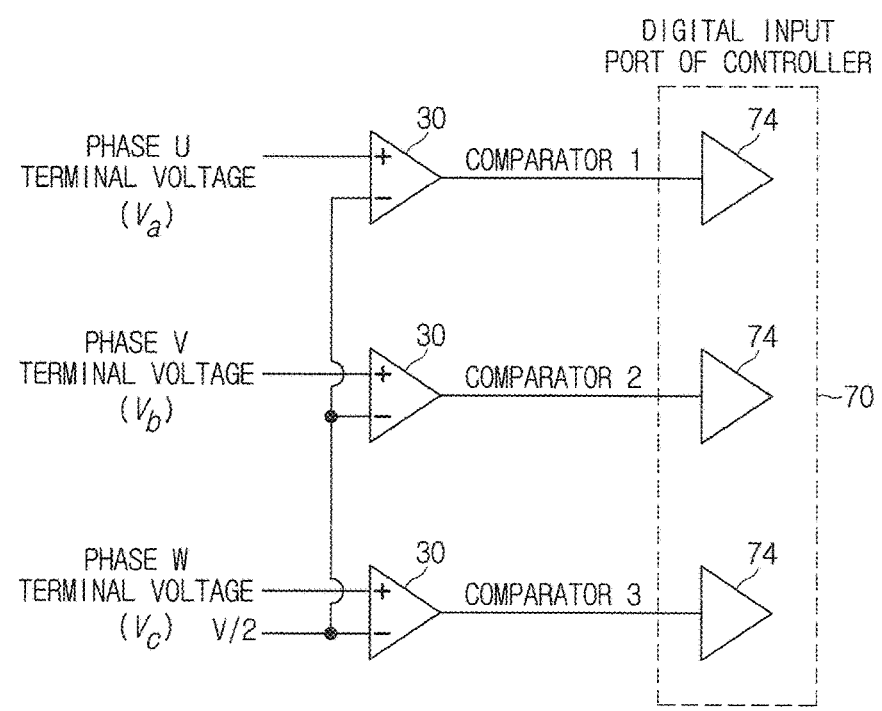

FIG. 5 is a control flow illustrating a terminal voltage detector and a zero point comparator and FIGS. 6 and 7 are views illustrating a detailed configuration of a terminal voltage detector in accordance with an embodiment of the present disclosure.

As illustrated in FIG. 5, the terminal voltage detector 50 may detect a voltage between terminals including a back EMF between phases by receiving each terminal voltage from the BLDC motor by using a differential amplifier, and may transmit the voltage between terminals to the ZP comparator 61.

The ZP comparator 61 may compare the voltage between terminals, which is received from the terminal voltage detector 50, with an input voltage of the motor through the comparator so that a square wave signal, which is configured to output a positive voltage in a period where a difference between a terminal voltage and the input voltage of the motor is positive, and configured to output a negative voltage in a period where a difference between a terminal voltage and the input voltage of the motor is negative.

In FIG. 5, Va, Vb, and Vc are a phase voltage, Vac, Vba, and Vcb are a voltage between terminals between phases, and Sac, Sba, and Scb are a signal transmitted by comparing a three phase terminal voltage with an input voltage of the motor.

Referring to FIG. 6, terminal voltages Va, Vb, and Vc of three phases (U, V, W) of a DC motor may be divided by a resistance R1 and R2 and then inputted to a A/D input port 72 of the controller 70. An additional zener diode may be included in the A/D input port 72 so that a voltage value, which is divided by each resistance distribution circuit R1 and R2, is limited within a range of the A/D input voltage of each phase terminal voltage.

In addition, a sensorless operation period of BLDC motor, a result of comparing a terminal voltage of each phase (U, V, W) with a half of a voltage of the DC terminal of the three phase inverter 100 may be input to a digital input port 74 of the controller 70 so as to detect a ZCP of the three phase back EMF included in the three phase terminal voltage.

Figure 8:
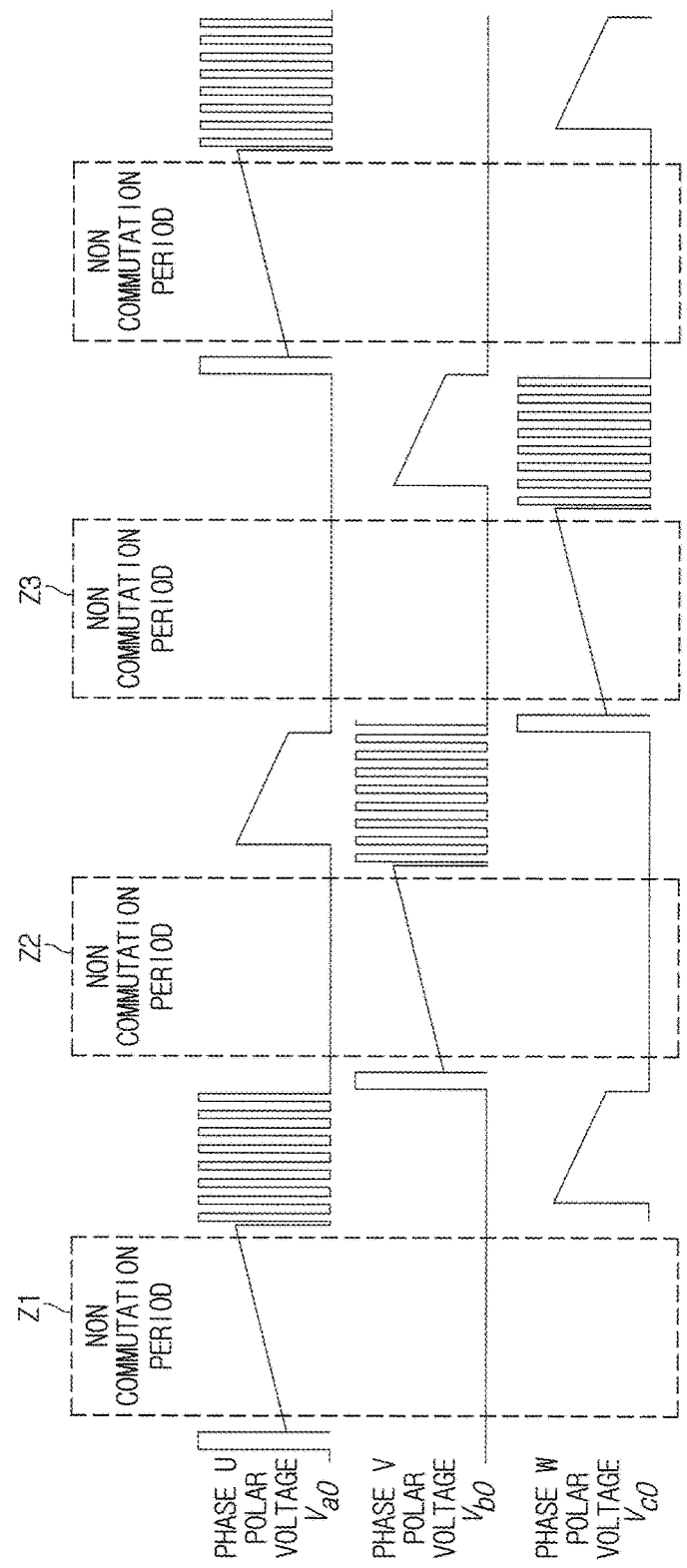
FIG. 8 is a view illustrating a signal in which a non-commutation period is generated from a PWM signal in accordance with an embodiment of the present disclosure.
Figure 9:
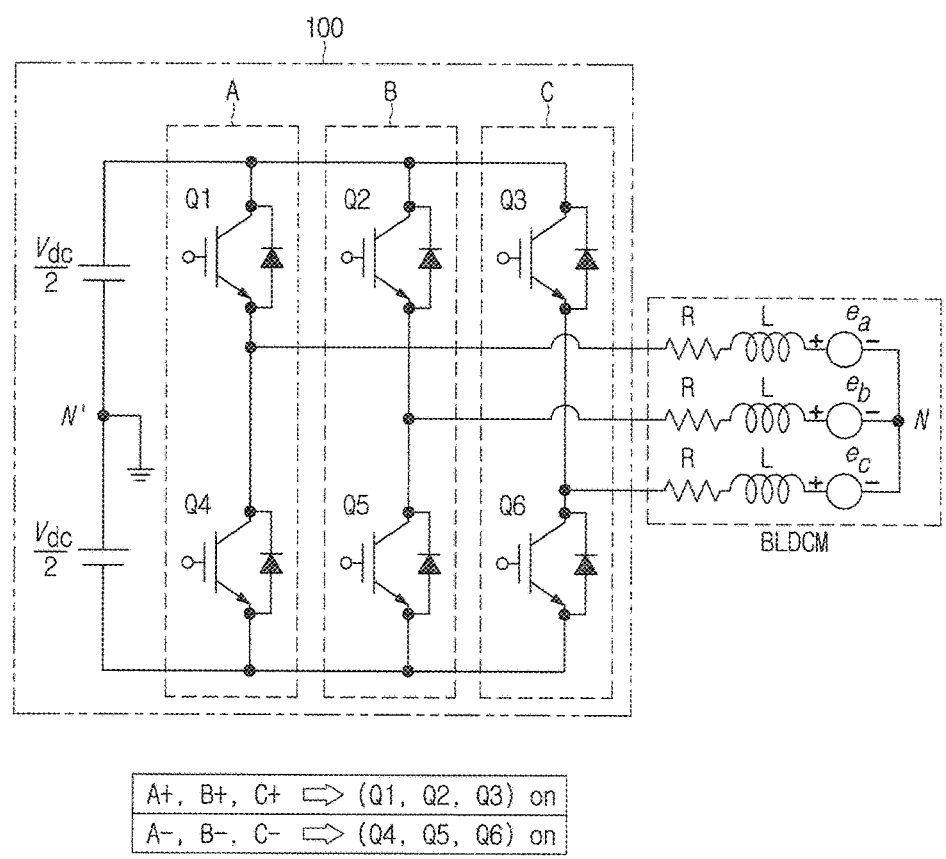
FIG. 9 is a view illustrating a switch operation to generate a non-commutation signal period in accordance with an embodiment of the present disclosure.

FIG. 8 is a view illustrating a signal in which a non-commutation period is generated from a PWM signal in accordance with an embodiment of the present disclosure, and FIG. 9 is a view illustrating a switch operation to generate a non-commutation signal period in accordance with an embodiment of the present disclosure.

As mentioned above, according to the conventional method of sensorless driving of a BLDC motor, the PWM control may be performed on the three phase back EMF included in the terminal voltage, and a ZCP of the three phase back EMF may be extracted from the PWM control so that a switch of the three phase inverter 100 may be controlled.

However, in a period in which the motor is driven at a low speed, there are many pulses of the PWM signal and the size of the back EMF is small. Accordingly, the switching noise may be large and thus there may be difficulties in detecting an accurate ZCP.

Therefore, the controller 70 may perform a non-commutation control on the PWM signal based on the three phase back EMF so that the difficulties caused by the switching noise may be relieved and the accurate ZCP may be detected, thereby detecting a position of the rotor precisely.

According to a device for driving a sensorless BLDC motor in accordance with an embodiment of the present disclosure, there is not an additional position detection sensor, e.g., a hall sensor, to detect a position of a rotor, and thus the rotor may be arranged according to a predetermined phase prior to driving the motor.

Referring to FIG. 8, the controller 70 may perform a three phase non-commutation control on the PWM signal to generate a non-commutation signal period in each phase. The controller 70 may detect a three phase back EMF based on the three phase terminal voltage detected by the terminal voltage detector 50 and generate a PWM signal on the three phase back EMF. At this condition, the controller 70 may perform the non-commutation control in the PWM control generating a PWM signal, and particularly, the controller 70 may remove the PWM signal by controlling the switches Q1 to Q6 in a low-speed period.

As illustrated in FIG. 8, the controller 70 may generate a non-commutation period (Z1) in a U phase, a non-commutation period (Z2) in a V phase, and a non-commutation period (Z3) in a W phase. In addition, as illustrate in FIG. 9, the non-commutation period may generate a non-commutation signal by controlling the switches Q1 to Q6.

As illustrated in FIGS. 2 and 3, the controller 70 may generate the switching pattern configured to drive the switch A (Q1 and Q4), the switch B (Q2 and Q5), and the switch C (Q3 and Q6) by controlling the PWM signal generator 80.

To generate a non-commutation signal period about the PWM signal of the three phase DC motor, all of Q1, Q2, and Q3 may be turned on, and all of Q4, Q5, and Q6 may be turned off. When all of Q4, Q5, and Q6 are turned on, and all of Q1, Q2, and Q3 are turned off, the non-commutation period may be generated.

Since a pulse of the PWM signal does not exist in the non-commutation period, an accurate ZCP may be detected from a PWM non-commutation signal period. That is, the ZCP detector 60 may receive a PWM signal in which the non-commutation control is performed, and detect a ZCP of the three phase back EMF based on the non-commutation signal period generated through the PWM control.

Figure 10:
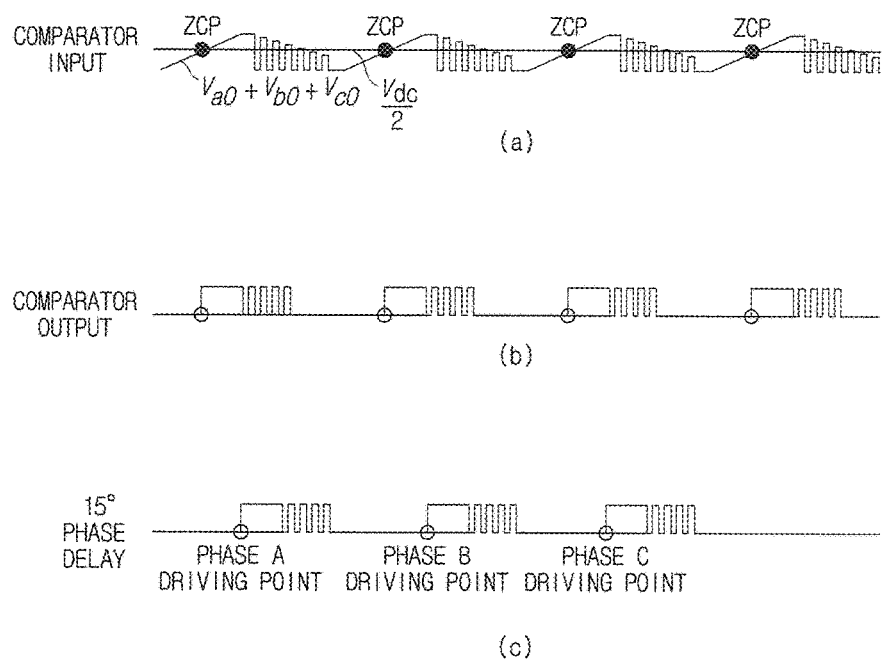
FIG. 10 is a view illustrating a signal in which a zero cross point is detected and a signal is outputted through a comparator in accordance with an embodiment of the present disclosure.

FIG. 10 is a view illustrating a signal in which a zero cross point is detected and a signal is outputted through a comparator in accordance with an embodiment of the present disclosure.

Part (a) of FIG. 10 illustrates that a ZCP is detected from a PWM signal including a non-commutation period by the ZCP detector 60. The ZP comparator 61 included in the ZCP detector 60 may receive a PWM signal of three phase terminal voltage in which the non-commutation control is performed by the controller 70, and may detect a ZCP of the three phase back EMF by comparing the received three phase terminal voltage with the input voltage of the motor.

In addition, the ZP comparator 61 may output a signal as illustrated in part (b) of FIG. 10 by outputting a positive voltage in a period in which a difference between the three phase terminal voltage included in the PWM signal of the three phase terminal voltage and the input voltage of the motor is positive, and outputting a zero voltage in an period in which a difference between the three phase terminal voltage and the input voltage of the motor is negative, and the output signal may be input to the controller 70.

As illustrated in part (c) of FIG. 10, the controller 70 may delay a phase of a signal outputted through the ZP comparator 61. That is, the ZCP detected by the ZP comparator 61 may be a driving point of the three phase motor, and may drive the three phase motor by delaying 15° with respect to the ZCP. When delaying the phase, the motor may be driven in the same manner as a position detection sensor, e.g., a hall sensor.

Figure 11:
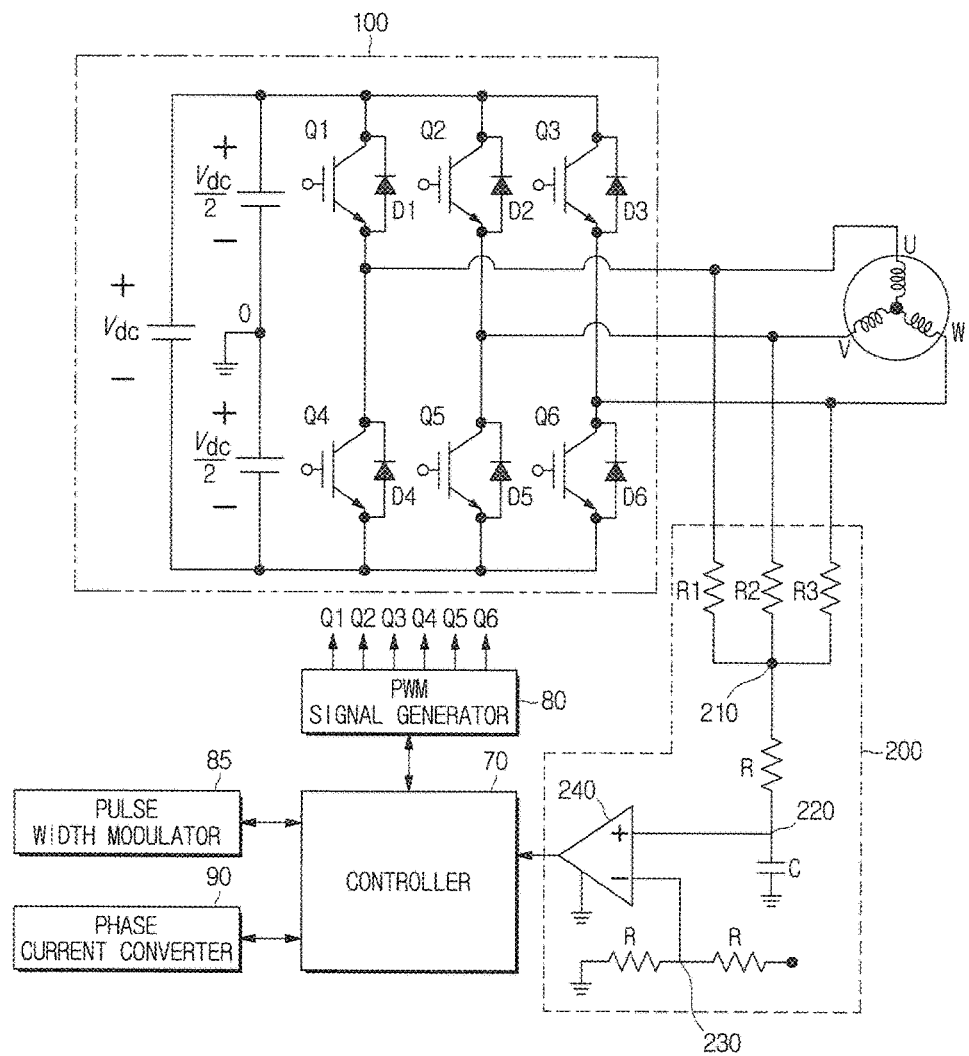
FIG. 11 is a view illustrating detection of a back electromotive force voltage by adding up each phase resistance in accordance with an embodiment of the present disclosure.

FIG. 11 is a view illustrating detection of a back electromotive force voltage by adding up each phase resistance in accordance with an embodiment of the present disclosure.

As illustrated in FIGS. 5 to 7, in a state of using three operational amplifiers (op-Amps), only when all three op-Amps are normally operated, a terminal voltage including a back EMF may be detected.

According to an embodiment, instead of using the three op-Amps, the resistance R1, R2, and R3 of each phase may be combined as a single value to detect a terminal voltage including a back EMF.

As illustrated in FIG. 11, a back EMF detector 200 configured to detect a back EMF may include a back EMF detection circuit 210, a Low Pass Filter (LPF) 220, a comparator 240 configured to compare a voltage acquired by the back EMF detection circuit 210 with a polar voltage (Vdc/2), and a polar voltage detector 230 configured to detect a polar voltage. As mentioned above, when resistances of each phase are combined as a single value to detect the back EMF, a difficulty, which is a back EMF is detected only when three op-Amps are normally operated, may be relieved and a circuit may be simply configured.

Figure 12:
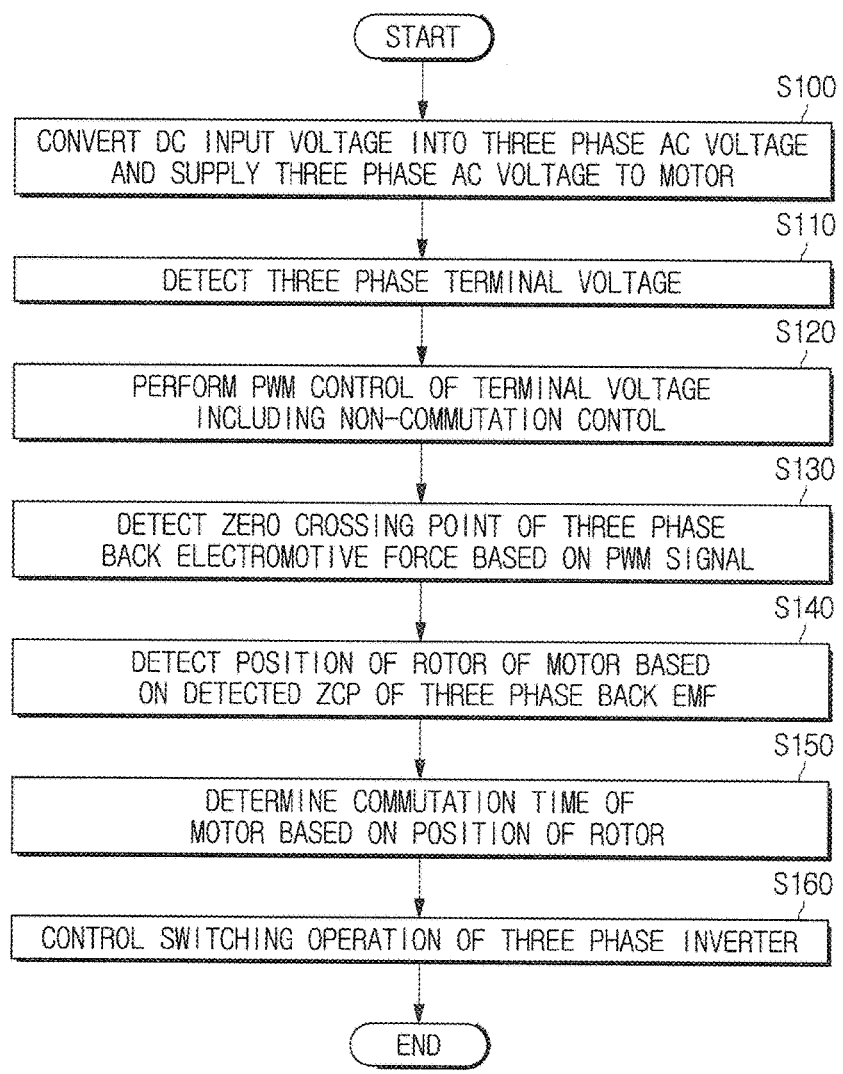
FIG. 12 is a flow chart illustrating a control method for driving a sensorless BLDC motor in accordance with an embodiment of the present disclosure.

FIG. 12 is a flow chart illustrating a control method for driving a sensorless BLDC motor in accordance with an embodiment of the present disclosure.

Referring to FIG. 12, a three phase inverter 100 may convert a DC input voltage into a three phase AC voltage and supply the three phase AC voltage to a motor (S100). That is, the three phase inverter 100 may be a typical switching circuit composed of six switches Q1 to Q6 and a diode, and may be configured to convert a DC power supplied from a rectifying unit into a three phase AC power (U, V, W) in a pulse shape having an arbitrary variable frequency and supply the AC power to a BLDC motor.

The terminal voltage detector 50 may detect a voltage between terminals by calculating a difference between voltages of output terminals of the three phase inverter 100 (S110), and may transmit the detected terminal voltage to the controller 70. The three phase terminal voltage detected by the terminal voltage detector 50 may include a back EMF of each phase of the three phase motor.

The controller 70 may perform a PWM control of a terminal voltage including the non-commutation control (S120). That is, the terminal voltage detector 50 may generate a non-commutation signal period in which a PWM signal is removed to prevent a current switching from occurring in the three phase inverter 100. The controller 70 may generate the non-commutation signal period in each phase by performing a three phase non-commutation control about the PWM signal.

The ZCP detector 60 may detect a ZCP of the three phase back EMF based on the PWM signal generated by the PWM control including the non-commutation control of the three phase terminal voltage that is performed by the controller 70 (S130). The ZCP detector 60 may detect the ZCP of the three phase back EMF by comparing the three phase terminal voltage with the input voltage of the motor by providing with the ZP comparator 61.

The controller 70 may detect a position of the rotor of the motor based on the detected ZCP of the three phase back EMF (S140), determine a commutation time of the motor based on the position of the rotor (S150), and control a switching operation of the three phase inverter (S160).

As is apparent from the above description, according to the proposed device and control method for driving a sensorless BLDC motor, the accuracy of detection of ZCP may be improved by removing a switching noise about a PWM signal of a back EMF through a non-commutation control.

In addition, the position information of the rotor may be precisely estimated by increasing the accuracy of the detection of ZCP through a non-commutation period during a PWM control.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A device for driving a sensorless brushless DC (BLDC) motor to switch a current applied to a stator winding based on a position of a rotor, the device comprising:
   a three phase inverter configured to convert a DC input voltage into a three phase AC voltage and supply the three phase AC voltage to the BLDC motor;
   a terminal voltage detector configured to detect a three phase terminal voltage from an output terminal of the three phase inverter; and
   a controller configured to:
   perform a pulse width modulation (PWM) control of the terminal voltage based on a three phase back electromotive force (EMF) included in the detected terminal voltage, wherein the PWM control comprises a non-commutation control that generates no PWM signals in a predetermined time period prior to and after each of Zero Crossing Point (ZCP)s of three phase pulses.

2. The device of claim 1, further comprising:
   a Zero Crossing Point (ZCP) detector configured to detect a ZCP of the three phase back EMF based on a PWM signal generated by the PWM control of the terminal voltage.

3. The device of claim 2, wherein the ZCP detector comprises a Zero Point (ZP) comparator configured to detect a ZCP of the three phase back EMF by comparing the detected three phase terminal voltage with an input voltage of the motor.

4. The device claim 3, wherein the ZP comparator is configured to output a positive voltage in a period in which a difference between the three phase terminal voltage and the input voltage of the motor is positive, and output a Zero voltage in a period in which a difference
   between the three phase terminal voltage and the input voltage of the motor is negative.

5. The device of claim 1, wherein the controller is configured to perform a non-commutation control configured to generate a non-commutation signal period by removing a PWM signal for an operation of a switch switching the current.

6. The device of claim 2, wherein the controller is configured to detect a position of the rotor of the motor based on the detected ZCP of the three phase back EMF, and control a switching operation of the three phase inverter based on the detected position of the rotor.

7. The device of claim 2, wherein the ZCP detector is configured to detect a ZCP of the three phase back EMF based on a non-commutation signal period generated by the PWM control of the terminal voltage including the non-commutation control.

8. The device of claim 2, further comprising:
   a phase current converter configured to drive the three phase inverter by determining a position of the rotor included in the motor based on the detected ZCP of the three phase back EMF, and determining a commutation time of the motor based on the determined position of the rotor.

9. The device of claim 2, further comprising:
a PWM signal generator configured to determine a switching pattern of a PWM signal based on the PWM control, and transmit the switching pattern to the three phase inverter.

10. The device of claim 9, further comprising:
a pulse width modulator configured to change a rotation speed of the motor by changing a pulse width of the PWM signal.

11. A method for driving a sensorless brushless DC (BLDC) motor to switch a current applied to a stator winding based on a position of a rotor, the method comprising:
converting a DC input voltage into a three phase AC voltage and supplying the three phase AC voltage to the BLDC motor;
detecting a three phase terminal voltage from an output terminal of a three phase inverter;
performing a pulse width modulation (PWM) control of the terminal voltage including a non-commutation control that generates no PWM signals in a predetermined time period prior to and after each of Zero Crossing Point (ZCP)s of three phase pulses, based on a three phase back electromotive force (EMF) included in the detected terminal voltage; and
detecting a Zero Crossing Point (ZCP) of the three phase back EMF based on a PWM signal generated by the PWM control of the terminal voltage.

12. The method of claim 11, wherein detecting the ZCP comprises detecting a ZCP of the three phase back EMF by comparing the detected three phase terminal voltage with the input voltage of the motor.

13. The method of claim 12, wherein the detection of the ZCP outputs a positive voltage in a period in which a difference between the three phase terminal voltage and the input voltage of the motor is positive, and outputs a Zero voltage in a period in which a difference between the three phase terminal voltage and the input voltage of the motor is negative.

14. The method of claim 11, wherein the non-commutation control generates a non-commutation signal period by removing a PWM signal for an operation of a switch switching the current.

15. The method of claim 11, further comprising:
detecting a position of the rotor of the motor based on the detected ZCP of the three phase back EMF and controlling a switching operation of the three phase inverter based on the detected position of the rotor.

16. The method of claim 11, wherein detecting the ZCP comprises detecting a ZCP of the three phase back EMF based on a non-commutation signal period generated from the PWM control of the terminal voltage including the non-commutation control.

17. The method of claim 11, further comprising:
driving the three phase inverter by determining a position of the rotor included in the motor based on the detected ZCP of the three phase back EMF, and determining a commutation time of the motor based on the determined position of the rotor.

18. The method of claim 11, further comprising:
determining a switching pattern of the PWM signal based on the PWM control and transmitting the switching pattern to the three phase inverter.

19. The method of claim 11, further comprising:
changing a rotation speed of the motor by changing a pulse width of the PWM signal.

* * * * *